United States Patent [19]
Andrews et al.

[11] Patent Number: 5,965,223
[45] Date of Patent: *Oct. 12, 1999

[54] LAYERED COMPOSITE HIGH PERFORMANCE FABRIC

[75] Inventors: Mark A. Andrews, Concord; James B. Miles, Kannapolis, both of N.C.

[73] Assignee: World Fibers, Inc., Concord, N.C.

[ * ] Notice: This patent issued on a continued prosecution application filed under 37 CFR 1.53(d), and is subject to the twenty year patent term provisions of 35 U.S.C. 154(a)(2).

[21] Appl. No.: 08/948,636

[22] Filed: Oct. 10, 1997

Related U.S. Application Data

[60] Provisional application No. 60/028,317, Oct. 11, 1996, and provisional application No. 60/028,319, Oct. 11, 1996.

[51] Int. Cl.$^6$ .......................... B32B 27/00; B32B 17/00; B32B 7/04
[52] U.S. Cl. ..................... 428/34.5; 428/35.6; 428/35.8; 428/36.1; 428/36.3; 428/36.7; 428/36.91; 428/1; 442/203; 442/204; 442/301; 442/302; 442/312; 442/316; 66/196; 66/202; 138/123; 2/167; 2/169
[58] Field of Search .................................. 428/36.1, 36.3, 428/36.9, 35.6–34.5, 35.8, 36.7, 36.91; 442/203, 204, 301, 302, 312, 316; 2/167, 169; 66/196, 202; 138/123

[56] References Cited

U.S. PATENT DOCUMENTS

| | | | |
|---|---|---|---|
| 4,004,295 | 1/1977 | Byrnes, Sr. | 2/161 |
| 4,143,197 | 3/1979 | Jasionowicz et al. | 428/225 |
| 5,399,418 | 3/1995 | Hartmanns et al. | 428/218 |

FOREIGN PATENT DOCUMENTS

| | | |
|---|---|---|
| 599584 | 6/1994 | European Pat. Off. . |

*Primary Examiner*—Rena L. Dye
*Attorney, Agent, or Firm*—Christopher C. Dremann PC; Christopher C. Dremann

[57] ABSTRACT

The present invention is a composite layered protective fabric having an outer primary layer composed of an abrasive material and an inner primary layer composed of an inherently cut-resistant material positioned below the outer primary layer and when assembled into a garment is positioned proximate to the wearer's skin. In another preferred embodiment of the present invention, a secondary layer is added to the inner and outer layer framework. The secondary layer is composed of a material that provides additional protection against potential threats other than cuts, that increases comfort or that improves aesthetics. The invented composite fabric is continuously manufactured in a one-step process which plates the layers of yarn. Thus formed, the invented composite fabric can be formed into cut-resistant apparel and articles that provide a high level of protection against sharp objects.

8 Claims, 2 Drawing Sheets

LAYERED COMPOSITE HIGH PERFORMANCE FABRIC

CROSS-REFERENCE TO RELATED APPLICATIONS

This application claims the benefit of U.S. Provisional Application No. 60/028,317 and U.S. Provisional Application No. 60/028,319, both filed on Oct. 11, 1996.

FIELD OF THE INVENTION

The present invention relates generally to protective fabrics. More particularly, the invention relates to a composite fabric having two or more layers of dissimilar cut-resistant material manufactured in a continuous one-step process.

BACKGROUND

Protective fabrics are used in numerous applications. For example, highly cut-resistant fabrics are used to manufacture article such as gloves, aprons, arm guards, leg covers and other protective apparel. Currently, a wide variety of techniques are employed to create those highly cut-resistant protective fabrics. Those fabrics are typically knitted with specially engineered yarns. Those yarns typically contain several fibers or strands, some or all of which exhibit cut-resistant properties. Those yarns are knitted into a single layer of fabric used to form an article.

Generally, those yarns incorporate at least two different cut-resistant materials. For example, a common yarn is constructed of a core member which is made from an abrasive material combined with another fibrous material. The abrasive core is wrapped with cover members made from a selected inherently cut-resistant material, typically those having a high lubricity. High performance lubricious materials are very expensive. Naturally, the performance of those yarns is directly affected by the choice of yarn components and by the structure of the yarn.

In addition to the lubricious material, the yarns may incorporate outer cover wraps made from materials that provide enhanced comfort, improve the yarn surface for the application of coatings, increase the bulk level of the composite yarn, and/or increase the abrasion resistance of the fabrics made from those yarns. Furthermore, the outer covers may be incorporated solely for aesthetic reasons such as visibility and product identification.

In operation, an article made with those highly engineered yarns, such as a protective glove, utilizes the abrasive core material to dull the cutting edge of a sharp object such as a knife. The exterior portion of the covers wrapped around the abrasive core, however, provides only minimal protection from the sharp edge of the knife. It is only after the sharp edge of the knife is dulled by the abrasive core that the highly lubricious cover material can effectively provide cut-resistance. Thus, only the interior portion of the lubricious material optimally performs its intended functions while the exterior portion of the lubricious material is under-utilized.

Other existing fabric, and the protective apparel made therefrom, is inefficient in providing protection because the cutting edge of the sharp object passes through half of the cover material before encountering the abrasive core which dulls the cutting edge so that the remaining lubricious material can optimally perform its intended functions. In a typical specially engineered yarn, the cutting edge of the sharp object passes through approximately fifty percent of the expensive highly lubricious material located in the exterior portion of the outer cover wraps before reaching the abrasive core. Only the remaining portion of the cover is useful in resisting a cut threat. Therefore, the cut resistance of existing engineered yarns do not perform at an optimal level because the exterior portion of the lubricious cover is not used and is therefore wasted.

Existing protective fabrics are made by machines equipped with a standard plating attachment used to add a liner of materials for aesthetic and comfort reasons to a layer of cut-resistant material. For example, gloves are manufactured with this equipment using the plating attachment to apply a more comfortable inner material to the glove fabric or to apply a less expensive material to the glove fabric. In particular, a spun aramid glove has been created which contains a cotton lining plated onto an aramid cover.

Therefore, while it is known to use a plating yarn in knitting protective fabrics, no existing fabric is composed of multiple layers of distinct yarns to perform the functions of cut resistance. Furthermore, no existing fabric has two layers of distinct cut-resistant materials and a third layer of non-cut resistant material which is capable of performing yet a third function.

A need, therefore, exists for a fabric that efficiently utilizes abrasive material and an inherently cut-resistant material to optimally resist a cut threat.

SUMMARY OF THE INVENTION

The present invention addresses the inadequacies of existing protective fabric by providing a composite fabric having multiple layers of yarn, plated together, each having distinct cut-resistant properties. The invented composite fabric has an unexpected level of cut-resistance when compared to a single-layer fabric having similar weight and comprised of the same materials. The invented composite fabric is continuously manufactured in a one-step process which secures the layers of yarn together. Thus formed, the invented composite fabric can be formed into cut-resistant apparel, such as sleeves, arm guards, chaps, aprons, leg protectors, jackets, vests, body suits, stirrup socks, and shoe liner. The invented composite fabric can also be formed into tubular articles such as jacketing for tubing, hose and wire.

The invented fabric can be produced on conventional fabric manufacturing equipment such as a knitting or weaving machine that is capable of producing at least two layers of yarn. The invented composite fabric is formed of at least two primary layers of yarn, each yarn having distinct cut-resistant characteristics. However, it is in within the scope of the invention to have three layers: an outer primary layer, an inner primary layer and a secondary layer. The layers are continuously formed in a one-step manufacturing process that plates, or knittingly secures, the layers together.

In a preferred embodiment, the invented composite fabric includes an outer primary layer and inner primary layer. The outer primary layer is made primarily of yarn composed of an abrasive material which dulls the cutting edge of a sharp object that presents a cut threat. Exemplary abrasive materials include fiberglass, wire, fiberglass and wire, grit based fibers, bicomponents (extruded filaments surrounding a core of dissimilar material), coated materials, and blends thereof. The abrasive yarns are preferably wrapped or encapsulated in a jacket of another fiber to prevent fugitive shards of abrasive material from escaping into the work environment.

The inner primary layer is positioned below the outer primary layer and when assembled into a garment is positioned proximate to the wearer's skin. The outer primary layer is positioned such that the cutting edge of a sharp object will contact it before the sharp edge contacts the inner primary layer.

The inner layer is made primarily of a yarn composed of an inherently cut-resistant material or a high tensile strength material. Inherently cut-resistant materials are those materials that roll with the cut threat, that have a lubricious surface causing the cut threat to "glide" over the fabric, or that have a molecular structure whose bonds are great enough to resist or prevent separation thereby slowing the cutting edges' ability to pass through the material. Exemplary inherently cut-resistant materials include aramids, ultra high molecular weight extended chain polyethylene, liquid crystal polyester, polyolefins, polyesters, polyamids, polybenzoxazoles PBO, polybenzothiazoles PBZT, bicomponents, coated materials, and blends thereof. Those materials can also be combined with an elastomer. Exemplary high tensile strength materials include those materials having a tensile strength of at least 9.0 grams per denier.

In another preferred embodiment of the present invention, a secondary layer is added to the inner and outer layer framework. Similar to the two-layer fabric, the three layers are continuously formed in a one-step manufacturing process which plates the layers together.

In one embodiment, the secondary layer is positioned below the inner primary layer. As a result, when the fabric is formed into a garment, the secondary layer will come into contact with the wearer's skin.

A variety of yarn materials can be used to form the secondary layer. Exemplary secondary layer materials that do riot melt, flow or support combustion include treated yarns such as flame-retardant rayon and flame-retardant cotton, fire resistant yarns such as para-aramids such as NOMEX, PBI, aramids, wool, bicomponents, coated materials, and blends thereof.

In high temperature applications, the flame-retardant secondary layer will protect the wearer's skin from the melting of the inner primary layer of inherently cut-resistant material which have a low melt point. Without the secondary layer of flameretardant material, the fabric would be unacceptable for high temperature applications, such as firefighting.

In addition, the secondary layer can also serve other functions as well such as abrasion resistance, enhanced acceptability to coating, thermal protection and other properties of protection. Finally, the material used in the secondary layer can be selected for purposes other than protection such as enhancement of comfort and aesthetic reasons.

In another embodiment, the secondary layer is made from a melt fusible thermoplastic material which can be automatically knitted into the fabric. The secondary layer of thermoplastic material can then be melt fused to form a barrier to contaminants and moisture or to form a generally impermeable barrier to particulates, microbials and gases. The melt fusible thermoplastic secondary layer can also be positioned exterior to the outer primary layer of abrasive yarn and then melt fused down into the two primary layers.

Exemplary melt fusible thermoplastic materials include low melt polyethylene, copolyesters, copolyamids, poly vinyl acetate, polylactic acid, D-polylactic acid, PVOH, ethyl vinyl acetate, and blends thereof.

In addition, the secondary layer can be composed of fibers with anti-microbial additives or anti-microbial coatings such that a membrane is coated or otherwise impregnated with the antimicrobial agent, or with compounds that includes heavy metals, most particularly silver nitrate for microbial protection.

The present invention has been tested and proven to be effective. Testing of the present invention was conducted on Shima Seki Glove Knitting Machine equipped with a standard plating attachment.

One embodiment of the present invention is a two layer fabric knitted into a protective glove on a Shima Seki machine. The outer primary layer is formed with an abrasive yarn. The tested abrasive yarn has a longitudinal core strand of three thousandth (0.003) inch thick stainless steel wire and a 500 denier polyester fiber.

This core is wrapped with another strand of 0.003 inch-stainless steel wire. The core and inner wire cover are wrapped with a middle fiber cover of 500 denier polyester. Finally, the core, inner wire cover and middle cover are wrapped by an outer cover of 1000 denier polyester. Each successive cover member is counter-wrapped over the cover member beneath.

The inner primary layer is formed of an inherently cut-resistant material. The inherently cut-resistant yarn tested is made of 1600 denier SPECTRA® ultra high molecular weight extended chain polyethylene.

A "Beta-Tech®" cut testing machine having a 180 gram weight applied to an arm containing a razor blade was used for all cut tests. A glove manufactured according to the present invention just described had a cut resistance of thirty-four.

By comparison, a first test glove knitted from just the abrasive yarn found in the outer primary layer of the invented glove described above had a cut resistance of four. A second test glove knitted from just the SPECTRA® yarn found in the inner primary layer of the invented glove described above had a cut resistance of two. It should be noted here that the weight of each of the two gloves manufactured from the separate fabrics was identical to the weight of the glove manufactured according to the present invention. The combined cut resistance of two for the SPECTRA® and four for the wire totals six. It was totally unexpected that when the fabrics were combined in the invented manner a jump in cut resistance from six to thirty four would be achieved.

A second test was conducted using a glove having the same abrasive outer primary layer as the previously described glove and having a two-ply eights cotton count spun aramid fiber inner primary layer. A glove having just the spun aramid fiber produces a cut resistance of four. When the two materials were combined according to the present invention a combined layered composite fabric was produced which exhibited a cut resistance level of ninety-two. In this example, it is clearly indicated that the invented fabric is a quantum leap higher in cut performance than the combined cut-resistance of the two individual fibers. The composite layered fabric according to the present invention had greater than ten times cut performance over the combination of the layers individually.

The invented composite layered protective fabric requires less material to produce the same level of strength and cut-resistance as existing protective fabrics. At the same time, the invented fabric provides greater tactile sensitivity, improved comfort and enhanced freedom of motion.

OBJECTS OF THE INVENTION

Accordingly, one of the objects of the present invention is to provide a protective fabric that provides superior protection from a cut threat.

Another object of the invention is to provide a protective fabric having multiple layers of distinct material.

Another object of the invention is to provide a protective fabric having an outer primary layer of abrasive material and an inner primary layer of inherently cut-resistant material.

Another object of the invention is to provide a protective fabric having an outer primary layer of abrasive material and an inner primary layer of high tensile strength material.

Another object of the invention is to provide a protective fabric having two primary layers of cut-resistant material and a secondary layer of a non-cut-resistant materials to provide protection against other threats.

Another object of the invention is to provide a composite layered fabric that provides superior cut-protection and comfort.

Another object of the invention is to provide a protective fabric that has a superior performance to weight ratio.

Another object of the invention is to maximize the effectiveness of expensive high performance material.

BRIEF DESCRIPTION OF THE DRAWINGS

In view of these and other objects which will more readily appear as the nature of the invention is better understood, the invention consists in the novel combination and arrangement of parts hereinafter more fully described, illustrated and claimed with reference being made to the attached drawings in which:

DETAILED DESCRIPTION

Figure 1:
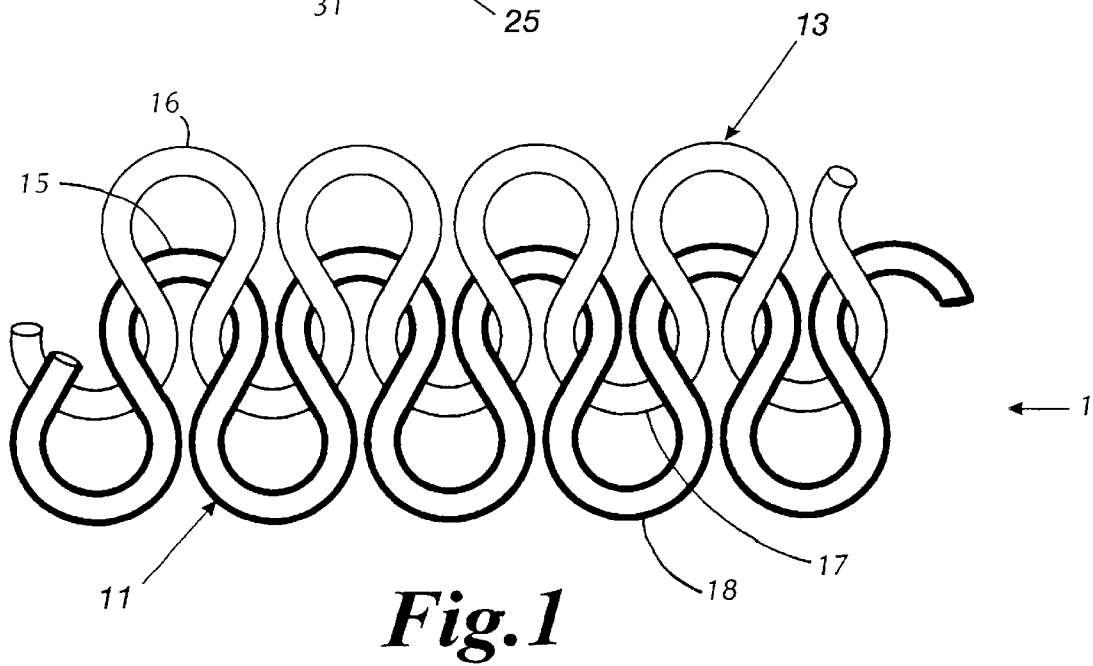
FIG. 1 is a magnified view of a two layer fabric formed according to the present invention.
Figure 3:
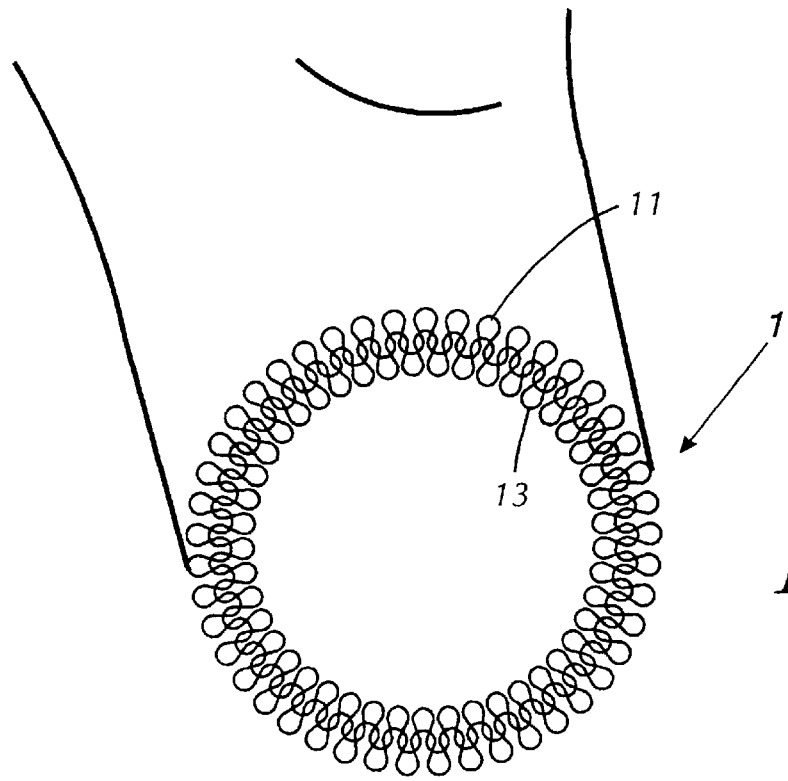
FIG. 3 is a cross-sectional view of the two layer fabric of FIG. 1.

The present invention is a composite layered protective fabric, referred to generally as 1, produced on a knitting machine. The invented fabric provides protection against the threat of cuts and other hazards. As shown in FIG. 1 and FIG. 3, a preferred embodiment of the invention includes an outer primary layer 11 and an inner primary layer 13. The outer primary layer 11 is formed with yarn made from an abrasive material. The inner primary layer 13 is formed with yarn made from an inherently cut-resistant material or a high tensile strength material.

The inner primary layer 13 and outer primary layer 11 are simultaneously combined in a continuous one-step knitting process that plates the layers together. Consequently, a composite fabric 1 is formed with two layers of yarn, each yarn having distinct cut-resistant properties. The resulting protective fabric 1 provides significantly greater cut protection than a single layer fabric of the same weight.

As shown in FIG. 1, each yarn has alternating bottom stitches and top stitches. The top stitches 15 of the outer primary layer 11 are aligned with the top stitches 16 of the inner primary layer 13 and the bottom stitches 17 of the outer primary layer 11 are aligned with the bottom stitches 18 of the inner primary layer 13.

The continuous one-step manufacturing process plates the outer primary layer 11 to the inner primary layer 13. The top stitches 15 of the outer primary layer 11 are intertwined with adjacent bottom stitches 17 of the inner primary layer 13 and the bottom stitches 17 of the inner primary layer 13 are intertwined with adjacent top stitches 15 of the outer primary layer 15 thereby plating the layers together.

The outer primary layer 11 is the layer first contacted by the cutting edge of a sharp object. Because the outer primary layer 11 is made from an abrasive material, the abrasive material in the outer layer acts to dull the sharp edge of the cutting surface. As a result, once the sharp edge penetrates through the abrasive outer primary layer 11 to the inner primary layer 13, the material in the inner primary layer 13 can more effectively repel the sharp object.

Therefore, the present invention has, at a minimum, an outer primary layer 11 made with yarn composed of an abrasive material plated to an inner primary layer 13 of inherently cut-resistant material or high tensile strength material. Thus, the present invention positions the abrasive material and the inherently cut-resistant or high tensile strength materials where :hey are most effective.

Figure 2:
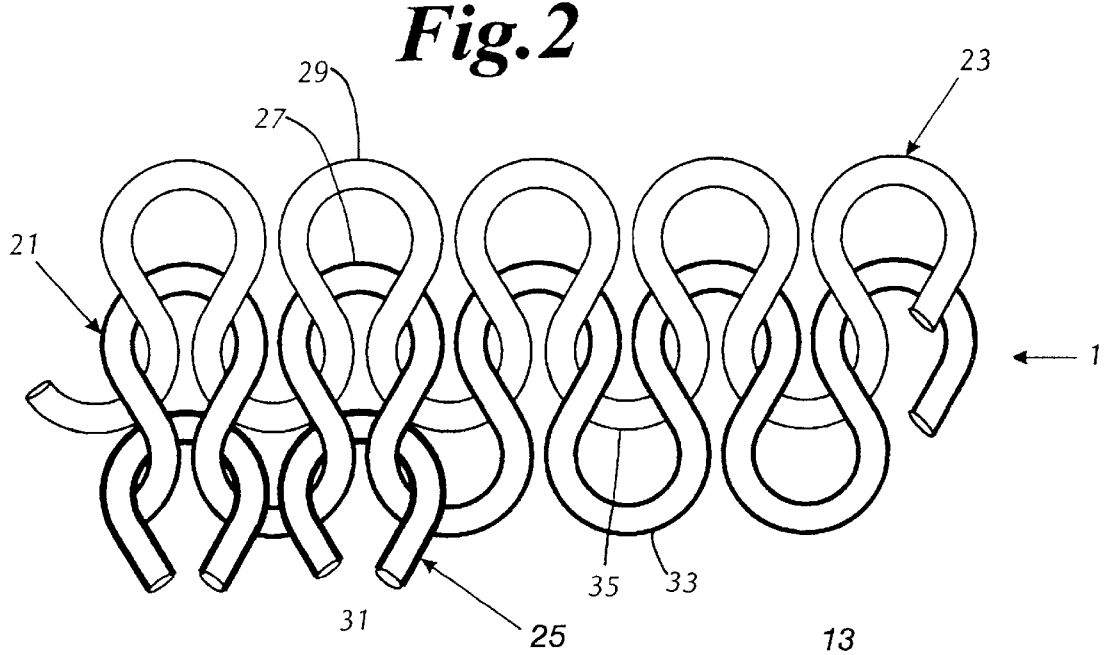
FIG. 2 is a magnified view of a three layer fabric formed according to the present invention.
Figure 4:
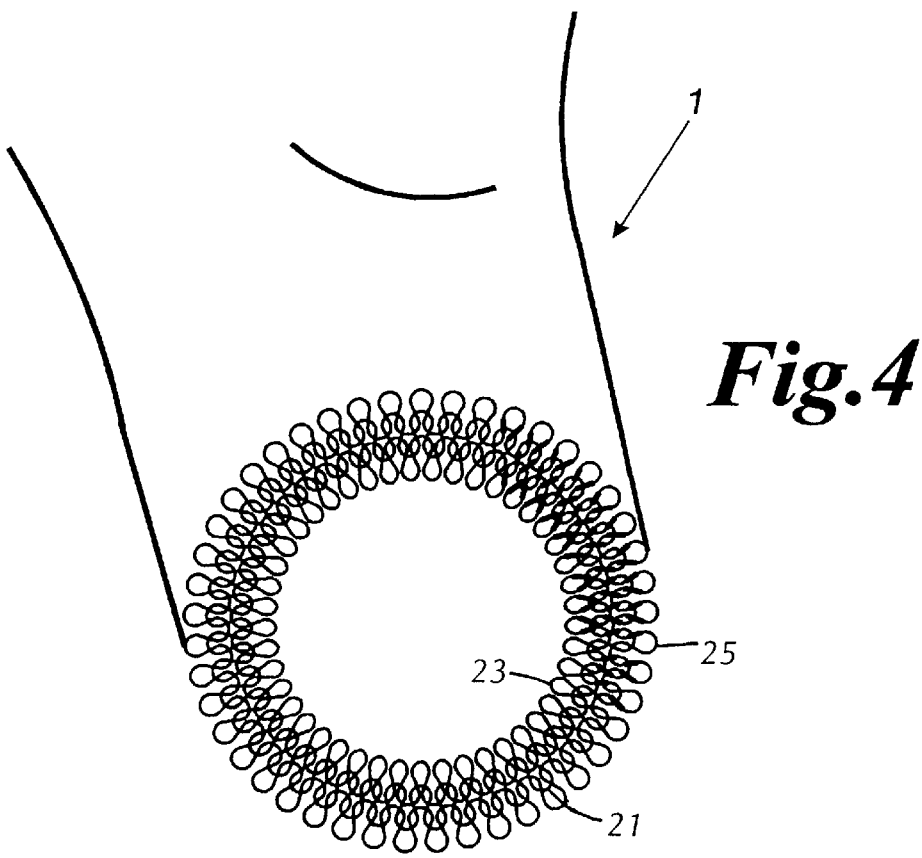
FIG. 4 is a cross-sectional view of the three layer fabric of FIG. 2.

As shown in FIG. 2 and FIG. 4, an alternative embodiment of the invented fabric includes a secondary layer 25 in addition to the outer primary layer 21 and the inner primary layer 23. The secondary layer 25 is positioned adjacent to the outer primary layer 21.

As shown in FIG. 2, each of the three yarn layers have alternating top and bottom stitches. The top stitches 27 of the outer primary layer 21 are aligned with the top stitches 29 of the inner primary layer 23 and the top stitches 31 of the secondary layer 25. Also, the bottom stitches 33 of the outer primary layer 21 are aligned with the bottom stitches 35 of the inner primary layer 23 and the bottom stitches (not shown) of the secondary layer 25. The upper stitches 31 of the secondary layer 25 are intertwined with the bottom stitches 33 of the outer primary layer 21 thereby plating the secondary layer 25 to the outer primary layer 21. The upper stitches 27 of the outer primary layer 21 are intertwined with the bottom stitches 35 of the inner primary layer 23 thereby plating the inner primary layer 23 to the outer primary layer 21.

It should be clear that the present invention provides for a multiplicity of embodiments by using any of a large number of protective materials in combination to form a composite layered fabric. Consequently, the invented fabric can be made into a large variety of articles and protective apparel used for protection against numerous potential threats.

In all of the embodiments, different materials can be used which can create garments that can address almost a limitless range of potential threats experienced by a given wearer. Some of these materials include antimicrobial materials, static dissipative materials, high visibility fibers, impact absorbing materials of synthetic or manmade components such as foam neoprene extruded thread, as well as the full range of conventional and unconventional textile materials. These materials may be combined in many fashions including but not limited to twisting, wrapping, spinning, commingling, coating, coextruding, braiding, entangling, plying, and others. The shared commonality between the materials is limited only to their ability to be knitted or woven into a protective fabric having an abrasive layer and an inherently cut-resistant layer interior to the abrasive layer. Finally, a secondary layer can be added to serve a large variety of functions.

The present invention provides an garment manufactured in an one step process with the exception of final finishing, such as the application of labels, overedging and other necessary second steps which create a finished product of apparel. The final finishing process typically produces articles of attachment that cannot be automatically manufactured on knitting and weaving equipment.

SUMMARY OF THE ACHIEVEMENT OF THE OBJECTS OF THE INVENTION

From the foregoing, it is readily apparent theft we have invented a protective fabric composed of two or more layers of yarns made from dissimilar material. The positioning of abrasive material in an outer primary layer and the positioning of inherently cut-resistant material in an inner primary layer maximizes the effectiveness of each material to provide protection against a cut threat. Finally, a third layer can be included to provide a wide assortment of beneficial attributes to the invented fabric for protection against numerous potential threats. The continuous one-step manufacturing process provides a fabric with unprecedented cut-resistant characteristics.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. A protective article made of a layered composite fabric and manufactured in a continuous one-step process to secure the layers of the fabric together, said article comprising:

an outer primary layer made of a yarn comprising an inherently abrasive material for dulling the cutting edge of a sharp object, said inherently abrasive material selected from the group consisting of fiberglass, fiberglass and wire, grit based fibers and blends thereof; and an inner primary layer positioned interiorly relative to said outer primary layer and plated thereto, said inner primary layer made of a yarn comprising an inherently cut-resistant material for resisting the cutting edge of the sharp object, said inherently cut-resistant material selected from the group consisting of aramids, ultra high molecular weight extended chain polyethylene, liquid crystal polyester, polyolefins, polyesters, polyamide, PBO, PBZT, and blends thereof.

2. A protective article according to claim 1 wherein said yarn of said outer primary layer further comprises a jacket made of a non-inherently abrasive material for containing fugitive shards of said inherently abrasive material.

3. A protective article according to claim 1 further comprising a secondary layer plated to one of said outer primary layer and said inner primary layer.

4. A protective article according to claim 3 wherein said secondary layer is positioned interiorly relative to said inner primary layer and plated thereto and wherein said secondary layer is made of a yarn comprising a material that does not melt, does not flow and does not support combustion selected from the group consisting of flame-retardant rayon, flame-retardant cotton, fire-resistant para-aramids, fire-resistant PBI, fire-resistant aramid, fire-resistant wool and blends thereof.

5. A protective article according to claim 3 wherein said secondary layer is made of a yarn comprising a melt fusible thermoplastic material selected from the group consisting of low melt polyethylene, copolyesters, copolyamids, poly vinyl acetate, polyactic acid, D-polyactic acid, PVOH, ethyl vinyl acetate and blends thereof.

6. A protective article according to claim 3 wherein said secondary layer is made of a yarn comprising an antimicrobial additive.

7. A protective article according to claim 6 wherein said antimicrobial additive is silver nitrate.

8. A protective article made of a layered composite fabric and manufactured in a continuous one-step process to secure the layers of the fabric together, said article comprising:

an outer primary layer made of a yarn comprising an inherently abrasive material for dulling the cutting edge of a sharp object, said yarn comprising
      a core consisting of a first longitudinal strand of stainless steel wire and a second longitudinal strand of polyester fiber having a denier of about 500;
      an inner cover comprising a strand of stainless steel wire wrapped about said core;
      a middle cover comprising a strand of polyester fiber having a denier of about 500 counter-wrapped about said inner cover; and
      an outer cover comprising a strand of polyester fiber having a denier of about 1000 counter-wrapped about said middle cover; and an inner primary layer positioned interiorly relative to said outer primary layer and plated thereto, said inner primary layer made of a yarn comprising an inherently cut-resistant material for resisting the cutting edge of the sharp object, said yarn comprising ultra high molecular weight extended chain polyethylene having a denier of about 1600.

\* \* \* \* \*